UNITED STATES PATENT OFFICE.

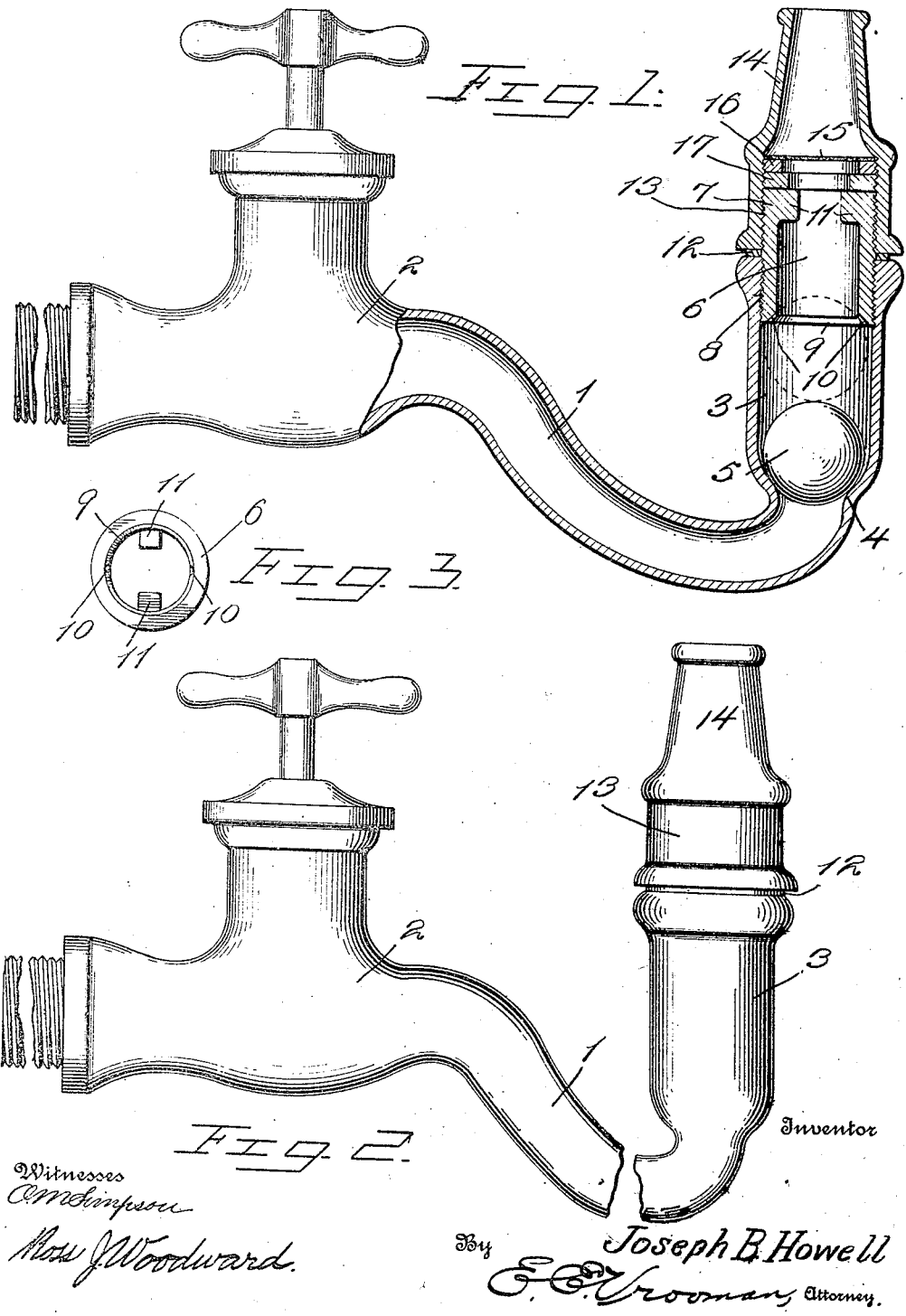

JOSEPH B. HOWELL, OF EAST WALPOLE, MASSACHUSETTS.

DRINKING-FOUNTAIN.

1,011,797.  Specification of Letters Patent.  Patented Dec. 12, 1911.

Application filed January 12, 1911. Serial No. 602,307.

*To all whom it may concern:*

Be it known that I, JOSEPH B. HOWELL, a citizen of the United States, residing at East Walpole, in the county of Norfolk and State of Massachusetts, have invented certain new and useful Improvements in Drinking-Fountains, of which the following is a specification, reference being had therein to the accompanying drawing.

This invention relates to drinking fountains, and the principal object of the same is to construct a fountain that the amount of water coming out will be automatically controlled and the flow thereby remain uniform. This is accomplished by having a valve so constructed that as the force of water increases the valve will close and, thus, prevent the water from coming out of the fountain any faster than desired.

This invention is illustrated in the accompanying drawings.

Figure 1 is a view of the improved fountain, a portion of the same being shown in section. Fig. 2 is an elevational view of the fountain. Fig. 3 is an end view of a nipple used in connection with the fountain.

Referring to the accompanying drawings by numerals it will be seen that the improved fountain resembles a water faucet. The nozzle portion 1 of the faucet 2 has its end curved upwardly and enlarged to form a chamber 3, the lower portion of which forms a rest 4 for the ball valve 5.

A cylindrical nipple 6 is provided upon its outer surface with oppositely disposed threaded portions 7 and 8, the threaded portion 8 being threaded into the end of the chamber 3. The inner end of the nipple is inwardly beveled as shown by the numeral 9, and is provided with a number of notches 10. The ball valve 5 is of such a size that it will be seated upon the beveled portion 9, as shown by the dotted lines in Fig. 1, but cannot pass into the nipple. It will be also noted that when the ball valve is seated upon the beveled portion liquid can pass through the notches. The outer end of the nipple is provided with a pair of inwardly extending lugs 11 which afford a convenient means for threading the nipple in place, and for removing the same.

A washer 12 is placed upon the end of the chamber 3, and surrounds the nipple. A nozzle 13 having a tapered upper portion 14 is threaded upon the outer end of the nipple and rests upon the washer 12 so that a tight joint is formed and there is no danger of leakage. A filtering screen 15 is placed within the nozzle and rests at the bottom of the larger portion 13 and is held in place by a nut lock 16. A washer 17, which is preferably formed of leather, is placed upon the nut 16 so that when the nozzle is threaded into place a tight joint will be formed, and there will be no danger of leakage.

In the operation of the device, the faucet 2 is turned on and the water enters the chamber 3 at the lower end. As the force of water increases the ball valve 5 is raised and permits the water to pass around it and out through the nipple and through the screen and nozzle. If the water force is increased, the ball valve is raised higher until it finally comes in contact with the end of the nipple. The passage way will thus be entirely closed with the exception of the notches 10. It will be noted, however, that as a strong force of water is necessary to raise the valve this high that there will be sufficient water passing through the notches 10 to permit a sufficient amount to pass out through the nozzle. If the force of the water becomes weaker, the ball valve drops and permits more water to pass out through the fountain. It will thus be seen that if the force of water is increased from the normal amount, excessive flow of water will be automatically prevented.

What I claim is:—

A valve housing, a valve in said housing, a nipple threaded in said housing and having its inner end beveled and provided with notches, a nozzle threaded upon the outer portion of said nipple and tapered for a portion of its length, to form an internal seat, a netting resting upon said seat, and a gasket between said netting and nipple, said nipple clamping said netting and gasket in place.

In testimony whereof I hereunto affix my signature in presence of two witnesses.

JOSEPH B. HOWELL.

Witnesses:
ANNE M. CUMINGS,
RALPH B. FRYE.